United States Patent
Ishitobi et al.

(10) Patent No.: US 8,421,962 B2
(45) Date of Patent: Apr. 16, 2013

(54) COLOR FILTER AND METHOD FOR MANUFACTURING COLOR FILTER

(75) Inventors: Tatsuro Ishitobi, Kashiwa (JP); Hideaki Yamagata, Kawasaki (JP); Koji Arai, Kawaguchi (JP); Masatoshi Oba, Kitakatsushika-Gun (JP); Masahiro Takahashi, Fujimino (JP); Masayuki Uchida, Kitakyushu (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 296 days.

(21) Appl. No.: 12/746,310

(22) PCT Filed: Dec. 3, 2008

(86) PCT No.: PCT/JP2008/071964
§ 371 (c)(1),
(2), (4) Date: Jun. 4, 2010

(87) PCT Pub. No.: WO2009/072522
PCT Pub. Date: Jun. 11, 2009

(65) Prior Publication Data
US 2010/0265439 A1    Oct. 21, 2010

(30) Foreign Application Priority Data

Dec. 7, 2007 (JP) .................... 2007-316823
Aug. 11, 2008 (JP) .................... 2008-206958

(51) Int. Cl.
*G02F 1/1335* (2006.01)

(52) U.S. Cl.
USPC ............... 349/106; 349/110; 349/155

(58) Field of Classification Search .......... 349/106
See application file for complete search history.

(56) References Cited

U.S. PATENT DOCUMENTS

| | | | |
|---|---|---|---|
| 7,474,372 B2* | 1/2009 | Lee ........................ | 349/125 |
| 7,742,129 B2* | 6/2010 | Li et al. ..................... | 349/106 |
| 2002/0140894 A1* | 10/2002 | Morimoto ................ | 349/156 |
| 2005/0151909 A1 | 7/2005 | Yagi et al. | |

FOREIGN PATENT DOCUMENTS

| | | |
|---|---|---|
| CN | 1637503 A1 | 7/2005 |
| JP | 11-248921 A1 | 9/1999 |
| JP | 2000-284111 A1 | 10/2000 |
| JP | 2001-324716 A1 | 11/2001 |
| JP | 2002-258267 A1 | 9/2002 |
| JP | 2003-015119 A1 | 1/2003 |
| JP | 2005-208583 A1 | 8/2005 |

* cited by examiner

Primary Examiner — Richard Kim
(74) Attorney, Agent, or Firm — Burr & Brown

(57) ABSTRACT

There is provided a color filter which can be manufactured by a simplified process and which will not short-circuit an electrode of a TFT substrate. The color filter includes a substrate, and a red layer, a green layer and a blue layer, formed on the substrate. When forming the green layer and the blue layer, these layers are not only formed on the substrate, but also laminated on the red layer to form a spacer comprised of the green layer and the blue layer, laminated on the red layer. The color filter further includes a transparent electrode layer which covers the substrate, the red layer, the green layer, the blue layer and the spacer, and an insulating black matrix layer formed on predetermined areas of the transparent electrode layer.

14 Claims, 10 Drawing Sheets

COLOR FILTER AND METHOD FOR MANUFACTURING COLOR FILTER

FIELD OF THE INVENTION

The present invention relates to a color filter for use in a liquid crystal display device.

BACKGROUND OF THE INVENTION

Spherical spacers, called bead spacers, have generally been used as spacers for maintaining a cell gap between a color filter and a thin-film transistor (TFT) substrate in a liquid crystal display device. Bead spacers are unfixed and exist also in a display region of a liquid crystal, display device. The use of bead spacers therefore entails the problem of lowering of the display quality of a liquid crystal device due to disturbance in light scattering/transmission caused by bead spacers and to disturbance in orientation in the vicinities of bead spacers. The limits of such conventional spherical spacers have therefore been pointed out, and attention is drawn to columnar spacers that can be formed and arranged in fixed positions.

A known method for the formation of columnar spacers involves forming a transparent electrode layer and then forming a photosensitive resin layer, followed by exposure/patterning with a photomask (see e.g. patent document 1).

With the prices of liquid crystal display devices coming down these days, there is an increasing demand for reduction in the cost of a color filter, a component of a liquid crystal display device. In view of this, it is being studied to form columnar spacers by laminating colored layers, because this method can manufacture columnar spacers without providing an independent spacer manufacturing step.

Patent document 1: Japanese Patent Laid-Open Publication No. 2001-324716

This method, however, has the drawback that when forming a transparent electrode layer after the formation of columnar spacers by the lamination of colored layers, the transparent electrode layer is exposed on the columnar spacers, which can cause short circuit between the electrode of the color filter and an electrode of a TFT substrate.

Upon the short circuit between the color filter electrode and the TFT substrate electrode, no voltage can be applied to liquid crystal molecules filling the gap between the color filter and the TFT substrate, making the liquid crystal display device inoperative.

SUMMARY OF THE INVENTION

The present invention has been made in view of the above problems. It is therefore an object of the present invention to provide a color filter which can be manufactured by a simplified process and which will not short-circuit an electrode of a TFT substrate.

In order to achieve the object, the present invention, in a first aspect, provides a color filter comprising: a substrate; a colored layer formed on the substrate; a spacer formed on the colored layer; a transparent electrode layer which covers the substrate, the colored layer and the spacer; and a black matrix layer formed on the transparent electrode layer on the substrate and the spacer.

Preferably, the spacer is formed by laminating on said colored layer at least one spacer colored layer of a different color from said colored layer. The spacer is preferably covered with the black matrix layer. The color filter preferably has a protective layer on the transparent electrode layer and the black matrix layer.

The present invention, in a second aspect, provides a method for manufacturing a color filter comprising the steps of: (a) forming a colored layer on a substrate; (b) forming a spacer on the colored layer; (c) forming a transparent electrode layer on the substrate, the colored layer and the spacer; and (d) forming a black matrix layer on the transparent electrode layer on the substrate and the spacer.

Preferably, the step (a) of forming a colored layer and the step (b) of forming a spacer are replaced with the step (e) of forming a colored layer of one color on the substrate and the step (f) of forming colored layers of another color on the substrate and on the colored layer, thereby simultaneously forming said at least one colored layer and a spacer.

In the step (d) of forming a black matrix layer, the black matrix layer is preferably formed such that it covers the spacer. Preferably, the method further comprises the step (g) of forming a protective layer on the transparent electrode layer and the black matrix layer after the step (d) of forming the black matrix layer.

The phrase "on the transparent electrode layer on the substrate and the spacer" refers to such a position that if the transparent electrode layer were absent, the black matrix layer would be in contact with the substrate, the spacer and the side surfaces of the colored layer(s), but would not be in contact with the top surface of the colored layer(s).

The phrase "the black matrix layer covers the spacer" refers to forming, after the formation of the transparent electrode layer on the surface of the spacer, the black matrix layer over the portion of the spacer, including the top surface and the side surfaces, which projects from the colored layer. The black matrix layer need not necessarily cover the entire surface of the spacer; it is only necessary for the black matrix layer to cover most part of the spacer.

The present invention makes it possible to provide a color filter which can be manufactured by a simplified process and which will not short-circuit an electrode of a TFT substrate.

DETAILED DESCRIPTION OF THE INVENTION

Preferred embodiments of the present invention will now be described in detail with reference to the drawings.

A description will be first given of a color filter 1 according to a first embodiment.

Figure 1:
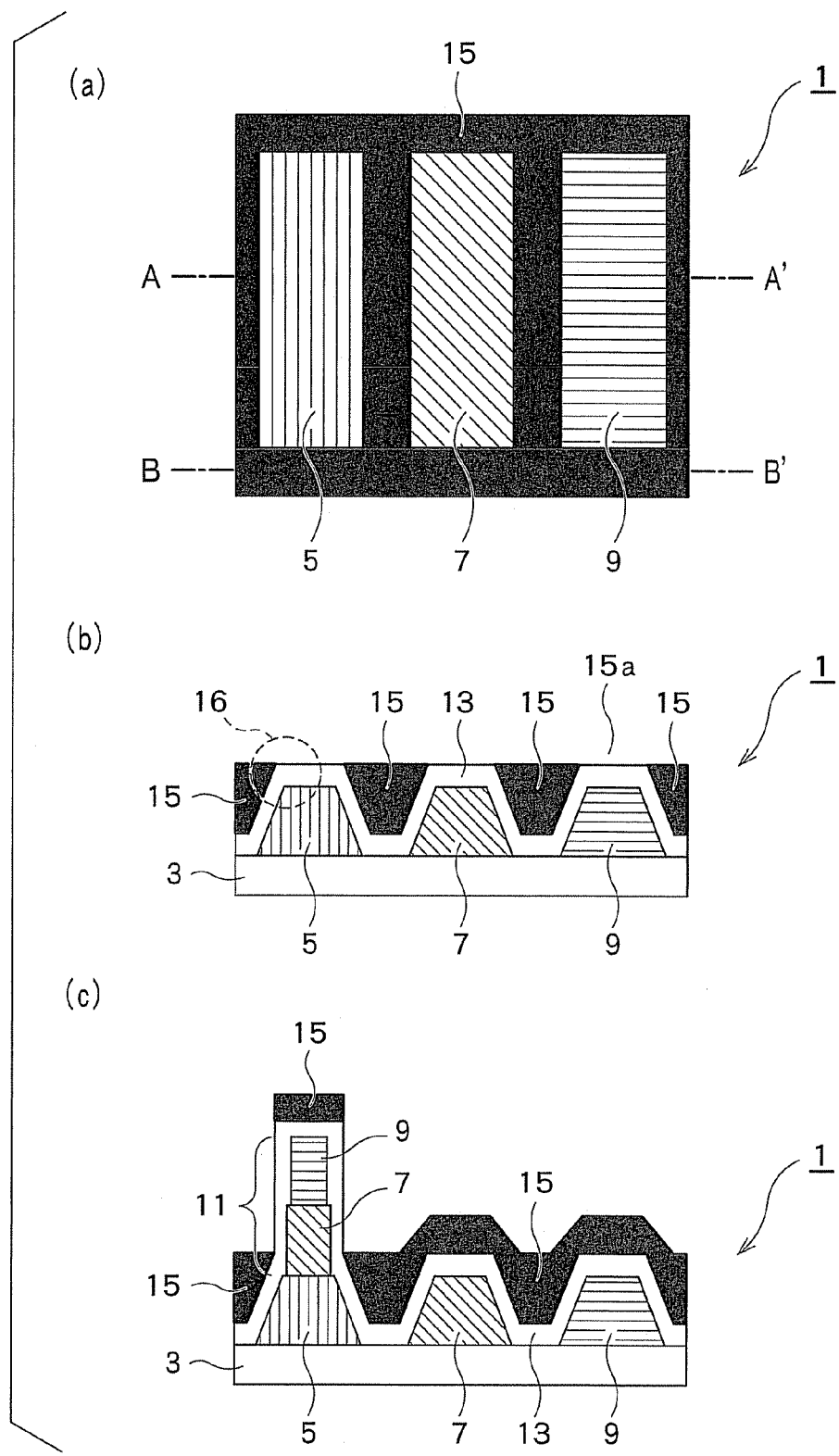
FIGS. 1(a) through 1(c) are diagrams illustrating a color filter according to a first embodiment.

FIG. 1(a) is a plan view of a color filter 1; FIG. 1(b) is a cross-sectional view taken along the line A-A' of FIG. 1(a); and FIG. 1(c) is a cross-sectional view taken along the line B-B' of FIG. 1(a). As shown in FIGS. 1(a) and 1(b), colored layers 5, 7, 9, consisting of a red layer 5, a green layer 7 and a blue layer 9, are formed, with their surfaces exposed, in openings 15a of a grid-like matrix 15. As shown in FIG. 1(b), the colored layers 5, 7, 9, consisting of the red layer 5, the green layer 7 and the blue layer 9 are formed in predetermined positions on a substrate 3, and a transparent electrode layer 13 is formed such that it covers the colored layers 5,7,9. A black matrix layer 15 is formed on the transparent electrode layer 13 on the substrate 3. As shown in FIG. 1(c), the color filter 1 includes the substrate 3, and the red layer 5, the green layer 7 and the blue layer 9, formed in predetermined positions on the substrate 3, and also includes a spacer 11 formed on the red layer 5. The spacer 11 is comprised of a green layer 7 and a blue layer 9. Further, the color filter 1 includes the transparent electrode layer 13 formed such that it covers the substrate 3, the red layer 5, the green layer 7, the blue layer 9 and the spacer 11, and also includes the black matrix layer 15 formed on the transparent electrode layer 13 on the substrate 3, the spacer 11, the green layer 7 and the blue layer 9. In FIG. 1(a), for convenience of drawing, the transparent electrode layer 13 is omitted and the red layer 5, the green layer 7 and the blue layer 9 are depicted as being exposed. The green layer 7 and the blue layer 9, constituting the spacer 11, serve as spacer colored layers 7, 9.

The color filter 1 is a stripe-type color filter and has colored layers, such as the red layer 5, the green layer 7 and the blue layer 9, formed under the black matrix 15 lying between pixels.

Figure 2:
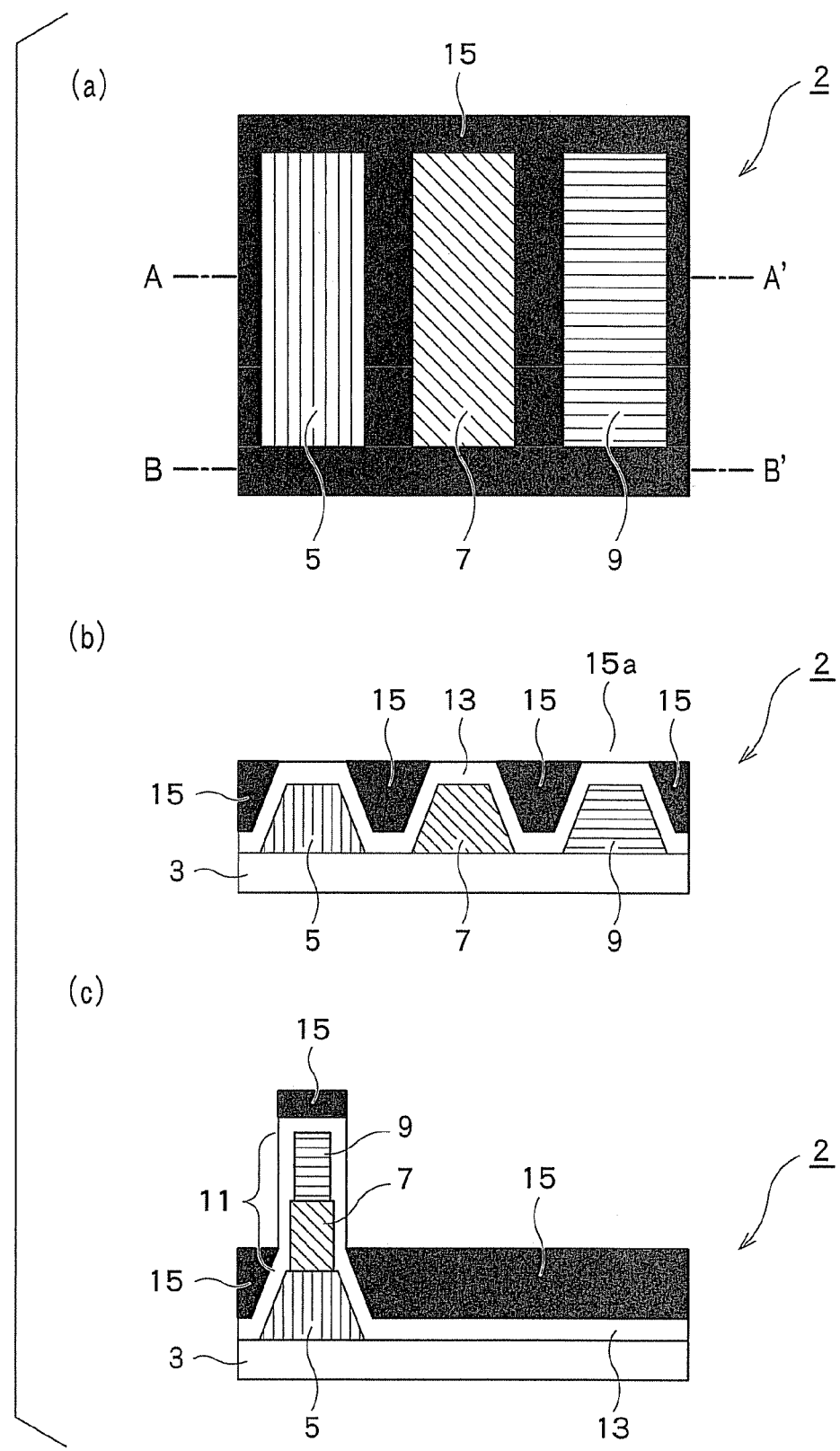
FIGS. 2(a) through 2(c) are diagrams illustrating another color filter according the first embodiment.

FIG. 2(a) is a plan view of another color filter 2 according to the first embodiment; FIG. 2(b) is a cross-sectional view taken along the line A-A' of FIG. 2(a); and FIG. 2(c) is a cross-sectional view taken along the line B-B' of FIG. 2(a). The color filter 2 is an island pattern-type color filter; FIG. 2(a) is the same as FIG. 1(a), and FIG. 2(b) is the same as FIG. 1(b), whereas as shown in FIG. 2(c), the filter 2 has no colored layer other than the red layer 5, serving as a supporting base for the spacer 11, under the black matrix 15 lying between pixels.

The substrate 3 may be a substrate generally used for a color filter. Examples of materials usable for the substrate include transparent rigid non-flexible materials such as borosilicate glass, alumino borosilicate glass, alkali-free glass, quartz glass, synthetic quartz glass, soda-lime glass and white sapphire; and transparent flexible materials such as a transparent resin film and an optical resin film. Specific examples of the flexible materials include polyacrylate such as polymethyl methacrylate, polyamide, polyacetal, polybutylene terephthalate, polyethylene terephthalate, polyethylene naphthalate, cellulose triacetate, syndiotactic polystyrene, polyphenylene sulfide, polyether ketone, polyether ether ketone, fluororesin, polyether nitrile, polycarbonate, modified polyphenylene ether, polycyclohexene, a polynorbornene resin, polysulfone, polyether sulfone, polyallylate, polyamide imide, polyether imide, thermoplastic polyimide, etc. A common plastic material can also be used. In particular, alkali-free glass is a material having a low coefficient of thermal expansion and excellent in the dimensional stability and in the characteristics upon high-temperature heat treatment.

The red layer 5 is formed from a photosensitive resin composition containing a pigment(s), such as a red pigment. While both a negative photosensitive resin and a positive photosensitive resin can be used as the photosensitive resin, a negative photosensitive resin is used in this embodiment.

The negative photosensitive resin is not limited to any particular one, and a commonly-used negative photosensitive resin may be used. For example, a chemically amplifying photosensitive resin based on a crosslinking resin, in particular a chemically amplifying photosensitive resin comprising polyvinyl phenol and containing a crosslinking agent and an acid generating agent, may be used. Another exemplary resin is an acrylic negative photosensitive resin containing a photopolymerization initiator which generates a radical component when irradiated with ultraviolet rays, a component containing an acrylic group in the molecule and capable of being cured through its polymerization reaction with the radical generated, and a component containing a functional group (e.g. acidic group when development is carried out with an alkaline solution) capable of dissolving an unexposed portion by development. The acrylic group-containing component may be a polyfunctional acrylic molecule having a relatively low molecular weight, such as dipentaerythritol hexaacrylate (DPHA), dipentaerythritol pentaacrylate (DPPA) or trimethylolpropane triacrylate (TMPTA). The acrylic group-containing component may be a polyfunctional acrylic molecule having a high molecular weight, such as a polymer in which an acrylic group has been introduced via an epoxy group into the carboxylic acid group moiety of a styrene-acrylic acid-benzil methacrylate copolymer, or a methyl methacrylate-styrene-acrylic acid copolymer.

The positive photosensitive resin is not limited to any particular one, and a commonly-used positive photosensitive resin may be used. An exemplary resin is a chemically amplifying photosensitive resin based on a novolac resin.

The green layer 7 is formed from a photosensitive resin composition containing a pigment(s), such as a green pigment. The blue layer 9 is formed from a photosensitive resin composition containing a pigment(s), such as a blue pigment. The above-described photosensitive resin compositions usable for the red layer 5 can be used also for the green and blue layers.

The spacer 11 is comprised of the green layer 7 and the blue layer 9, formed on the red layer 5. The spacer 11 maintains the gap between the color filter 1 and a TFT substrate.

The spacer 11 need not necessarily be formed on the red layer 5. Further, the colored layers need not be arranged in the order of red layer 5-green layer 7-blue layer 9: For example, the colored layers may be arranged in the order of red layer 5-blue layer 9-green layer 7, or in the order of blue layer 9-red layer 5-green layer 7. The spacer 11 may be constituted only one of the green layer 7 and the blue layer 9. The spacer 11 may be formed on a colored layer of one color, either above or below it, and may be comprised of one or both of the other two colored layers.

Though the color filter 1 of this embodiment has only the three colored layers, the red layer 5, the green layer 7 and the blue layer 9, it is possible to provide a colored layer(s) of other color(s), such as yellow or cyan. In that case, the colored layer(s) of the other color(s) may or may not be additionally used to form the spacer 11.

Tin oxide, indium oxide, or a composite oxide ITO (indium tin oxide) may be used for the transparent electrode layer 13.

The black matrix layer 15 is formed from a photosensitive resin composition containing a light shielding material. In order to prevent short circuit between the transparent electrode layer 13 and an electrode of a TFT substrate, the black matrix layer 15 preferably has a volume resistivity of not less than $10^3$ Ω·cm, more preferably not less than $10^8$ Ω·cm. The thickness of the black matrix layer 15 may be about 0.5 μm to 2 μm.

Carbon black, metal oxide powder such as titanium oxide or iron tetroxide, metal sulfide powder, metal powder and, in addition, a mixture of pigments of e.g. red, blue and green, etc. can be used as the light shielding material. While the above-described photosensitive resin compositions usable for the red layer 5 can be used also for the black matrix layer 15, it is preferred to use a more highly sensitive photosensitive resin composition because coloring of the resin is not needed.

Figure 3:
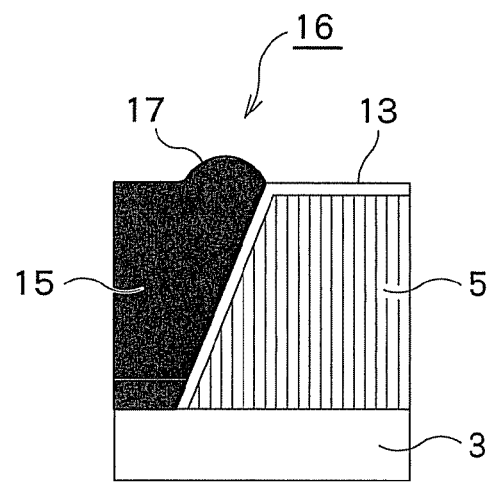
FIG. 3 is a diagram showing a boundary region of the color filter according to the first embodiment.
Figure 4A:
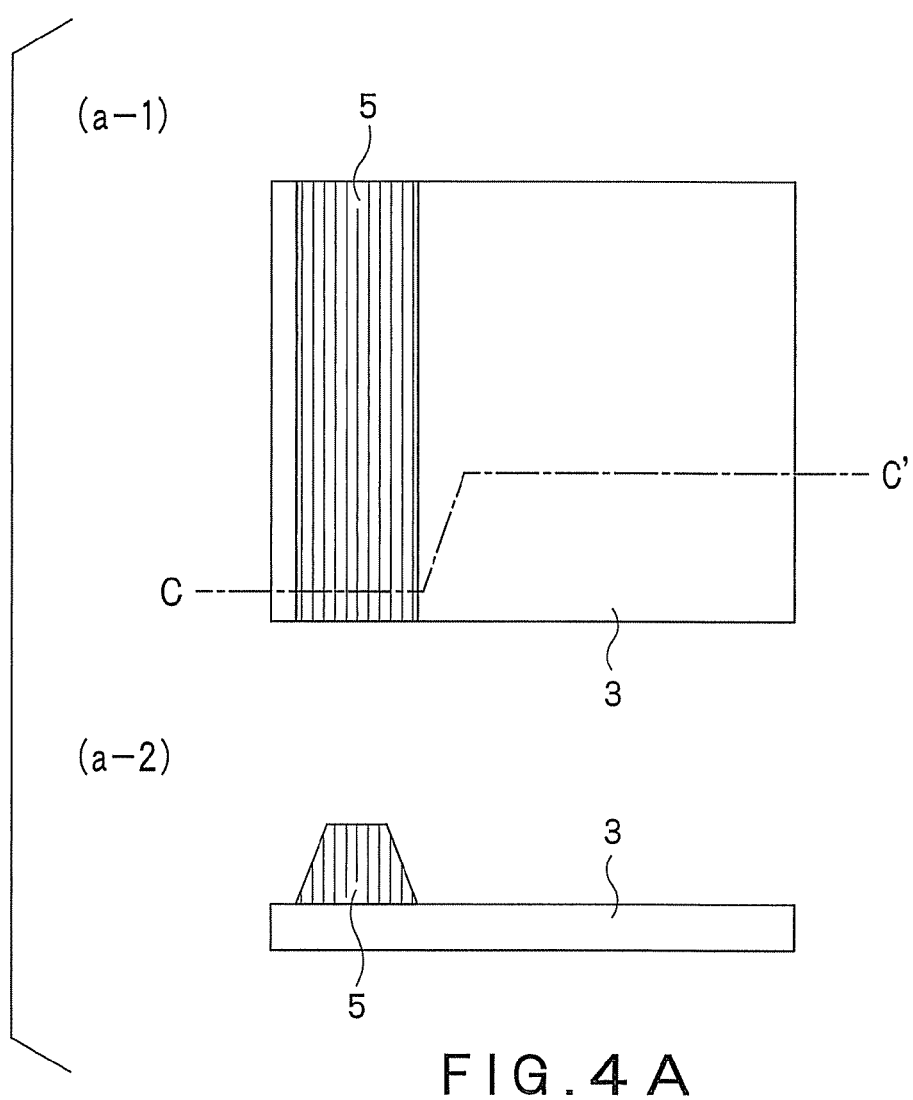
FIGS. 4A(a-1) and 4A(a-2) are diagrams illustrating a process step for the manufacturing of the color filter according to the first embodiment.

FIG. 3 is a diagram showing a boundary region between the top of the red layer 5 and the black matrix layer 15. As shown in FIG. 3, the black matrix layer 15 sometimes has a raised portion (pattern edge protrusion) 17, called corner bump, in the top boundary region of the black matrix layer 15. The corner bump 17 will disturb the molecular arrangement of liquid crystal molecules, leading to lowering of contrast and worsening of color tone in a liquid crystal display device. In the case where the black matrix layer 15 is laminated on the transparent electrode layer 13 formed on the red layer 5, the green layer 7 and the blue layer 9, the photosensitive resin composition containing a light shielding material, put on the colored layers, is likely to flow into grooves formed between the colored layers as shown in FIG. 4D, which will reduce the corner bump 17 after patterning. Further, the corner bump can be reduced to not more than 0.5 to 0.7 μm by making the overlap between the black matrix layer 15 and the red layer 5 not more than 6 μm.

A method for manufacturing the color filter 1 according to the first embodiment will now be described. FIG. 4A illustrates a process step in the manufacturing of the color filter 1. FIG. 4A(a-1) is a plan view of the substrate 3 and the red layer 5; and FIG. 4A(a-2) is a C-C' cross-sectional view of FIG. 4A(a-1). The same holds true for FIG. 4B(b-1), FIG. 4B(b-2), FIG. 4C(c-1), FIG. 4C(c-2), FIG. 4E(e-1) and FIG. 4E(e-2).

First, as shown in FIGS. 4A(a-1) and 4A(a-2), the red layer 5 is formed on the substrate 3. The red layer 5 is formed by applying a photosensitive resin containing a pigment to the substrate 3, and then carrying out patterning. Methods for applying the photosensitive resin include spin coating, casting, dipping, bar coating, blade coating, roll coating, gravure coating, flexographic printing, spray coating, die coating, etc.

After applying the photosensitive resin on the substrate 3, the resin on the substrate is irradiated with ultraviolet rays using a predetermined photomask to cure necessary portions. Thereafter, non-irradiated uncured portions of the photosensitive resin are dissolved and removed with a solvent, thereby forming the red layer 5.

Figure 4B:
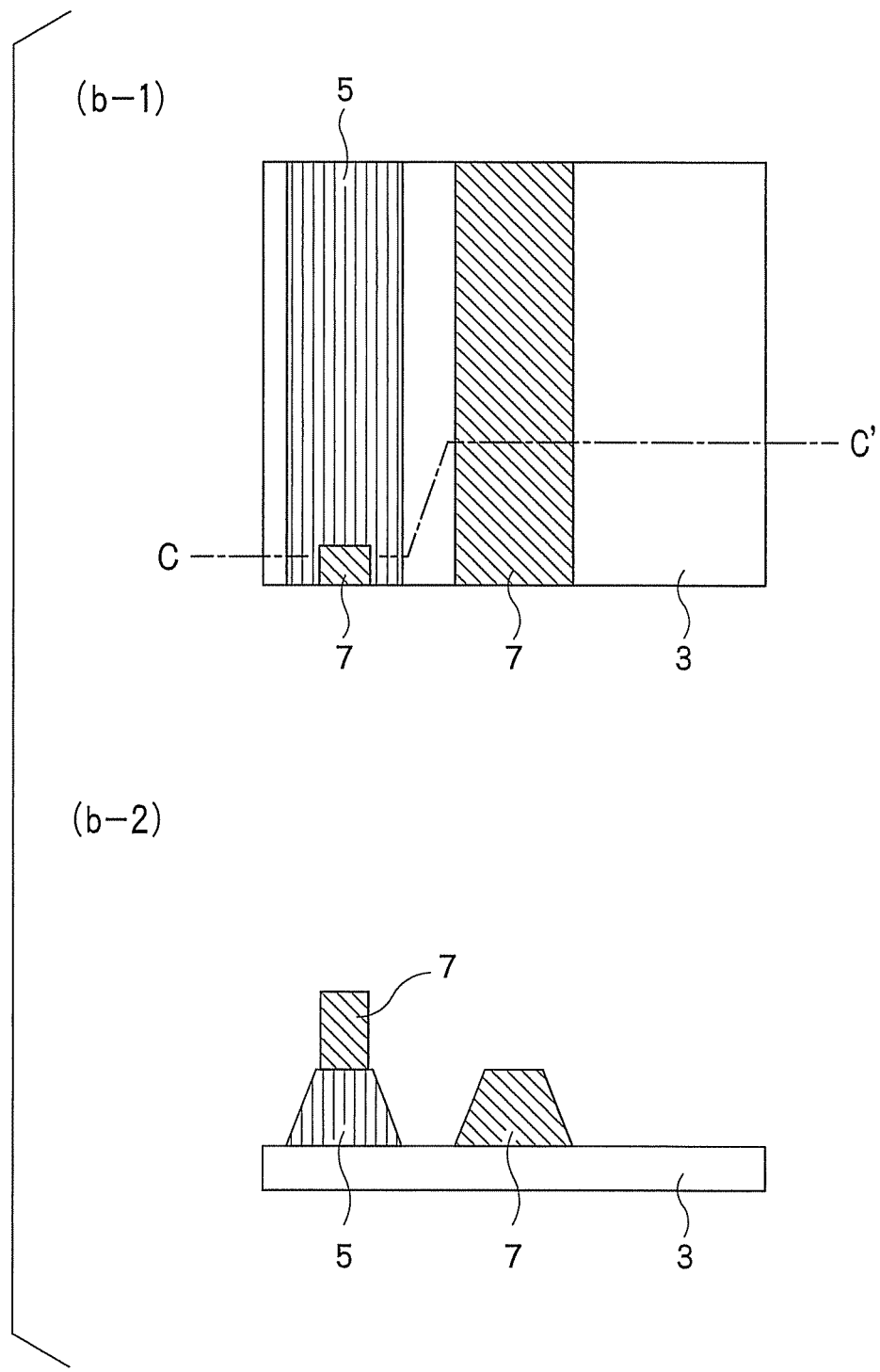
FIGS. 4B(b-1) and 4B(b-2) are diagrams illustrating a process step following the process step of FIGS. 4A(a-1) and 4A(a-2)

Next, as shown in FIGS. 4B(b-1) and 4B(b-2), the belt-like green layer 7 is formed on the substrate 3, and the green layer 7 for the spacer 11 is formed on the red layer 5 in an area to be covered with the black matrix layer 5. As with the red layer 5, the green layer 7 is formed by applying a photosensitive resin containing a pigment to the substrate 3, and then carrying out patterning.

Figure 4C:
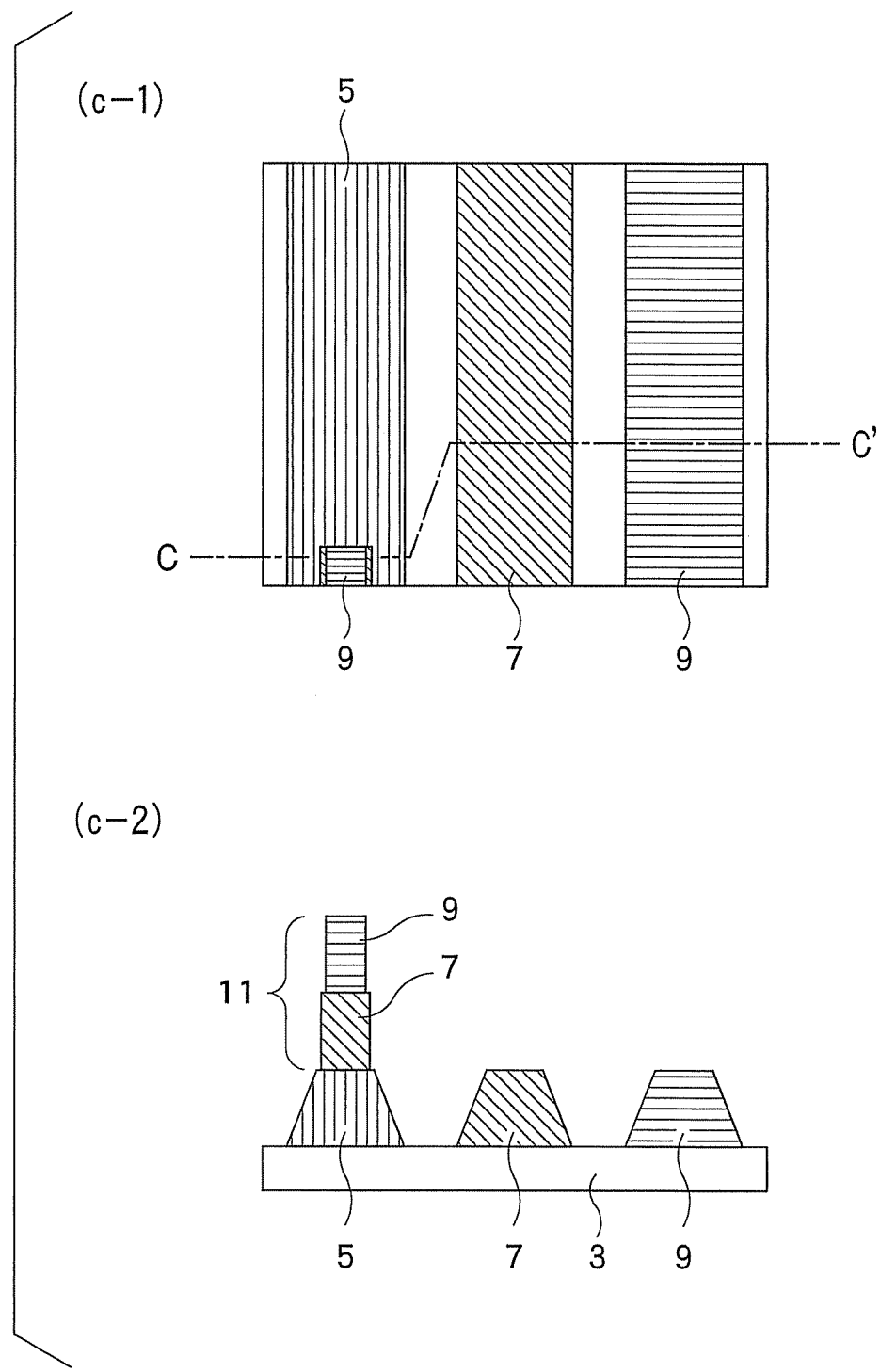
FIGS. 4C(c-1) and 4C(c-2) are diagrams illustrating a process step following the process step of FIGS. 4B(b-1) and 4B(b-2)
Figure 4D:
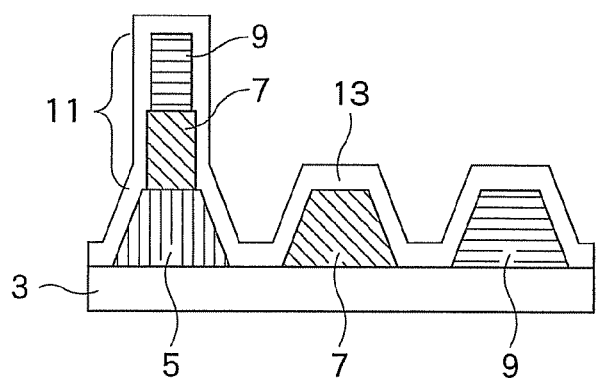
FIG. 4D is a diagram illustrating a process step following the process step of FIGS. 4C(c-1) and 4C(c-2)

Next, as with the green layer 7, the belt-like blue layer 9 is formed on the substrate 3, and the blue layer 9 for the spacer 11 is formed on the green layer 7 in an area to be covered with the black matrix layer 15, as shown in FIGS. 4C(c-1) and 4C(c-2). The spacer 11 is thus formed simultaneously with the formation of the green layer 7 and the blue layer 9.

Next, as shown in FIG. 4D, the transparent electrode layer 13 is formed on the substrate 3, the red layer 5, the green layer 7, the blue layer 9 and the spacer 11. The transparent electrode layer 13 is formed by vapor deposition or sputtering.

Figure 4E:
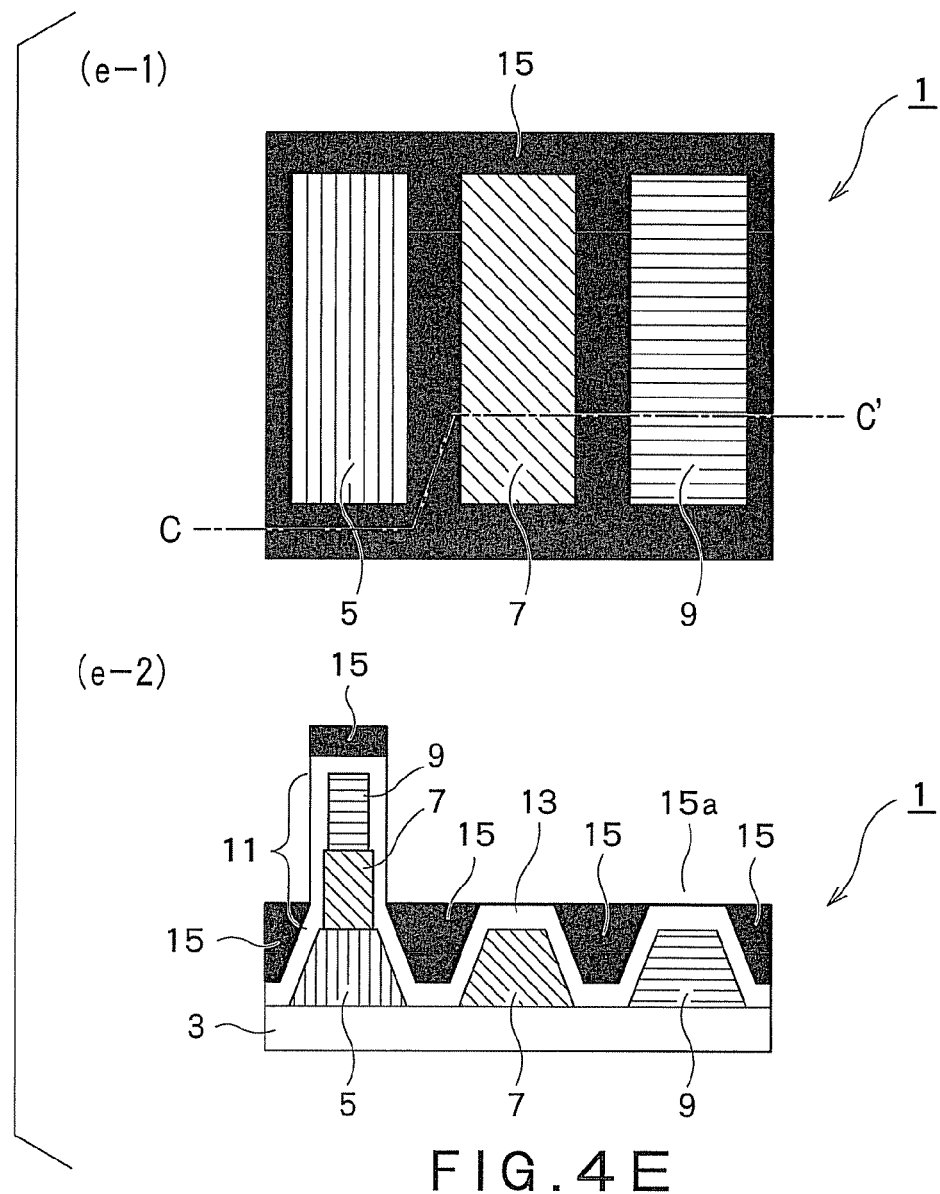
FIG. 4E is a diagram illustrating a process step following the process step of FIG. 4D.

Next, as shown in FIGS. 4E(e-1) and 4E(e-2), the black matrix layer 15 is formed on the transparent electrode layer 13. The black matrix layer 15 is formed by applying a photosensitive resin containing a light shielding material to the transparent electrode layer 13, and then carrying out patterning. The black matrix layer 15 has openings 15a so as not to shield light transmitted through the red layer 5, the green layer 7 and the blue layer 9.

When the color filter 1 is used in a liquid crystal display device, a TFT substrate is provided on the colored layer-side of the color filter 1. The TFT substrate, which includes a TFT and electrodes, is in contact with the black matrix layer 15 on the spacer 11. The gap between the TFT substrate and the color filter is filled with liquid crystal molecules. When the liquid crystal display device is in operation, on/off switching of application of a voltage to the liquid crystal molecules is performed by the TFT.

Figure 9:
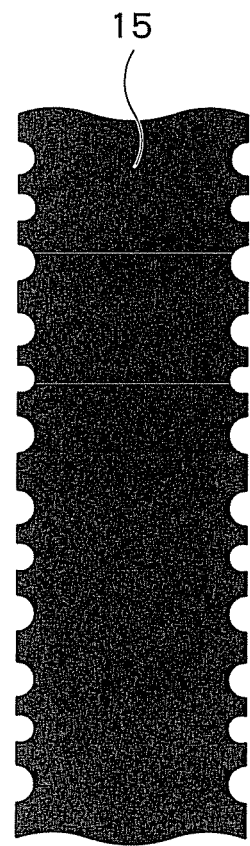
FIG. 9 is a diagram illustrating "jagging" (phenomenon that worsens the edge linearity and the dimensional accuracy) of a black matrix layer in a conventional color filter.

FIG. 9 is a diagram illustrating "jagging" of a black matrix layer in a conventional color filter. The "jagging" is a phenomenon which produces a jagged edge in a coating of a photosensitive resin composition after pattering, as shown in FIG. 9, when the photosensitive resin composition has poor adhesion to a base to which it is applied. The occurrence of the phenomenon worsens the edge linearity and the dimensional accuracy. The color filter 1 has the black matrix layer 15 formed on the transparent electrode layer 13. The black matrix layer 15 has better adhesion to the transparent electrode layer 13 than to the substrate 3 and the colored layers 5, 7, 9. Accordingly, compared to the case where the black matrix layer 15 is formed on the substrate 3 and the colored layers 5, 7, 9, "jagging" can be reduced and the patterned black matrix layer 15 can have a smooth edge and enhanced pattern linearity. The degree of "jagging" can be controlled within the range of ±2 μm. Thus, the apparent dimensional accuracy of the pattern size of the black matrix layer 15 can be enhanced without variation of the pattern size. Further, the liquid crystal display device can be free from non-uniform display.

According to the first embodiment, the spacer 11 is formed when forming the red layer 5, the green layer 7 and the blue layer 9. There is, therefore, no need to independently provide a process step for forming the spacer 11. The color filter 1 can thus be manufactured by the simplified process.

According to the first embodiment, the color filter 1 is in contact with a TFT substrate via the black matrix layer 15 which is an insulator. Accordingly, short circuit will not occur between the color filter 1 and the TFT substrate.

Further, according to the first embodiment, the "jagging" can be reduced and the patterned black matrix layer 15 can have a smooth edge and enhanced pattern linearity. Therefore, the apparent dimensional accuracy of the pattern size of the black matrix layer 15 can be enhanced without variation of the pattern size. Further, the liquid crystal display device can be free from non-uniform display.

Further, according to the first embodiment, the black matrix layer 15 is formed after the formation of the colored layers. This facilitates adjustment of the overlap width of the black matrix layer 15 with respect to the underlying colored layers, thus facilitating control of corner bumps.

A second embodiment will now be described.

Figure 5:
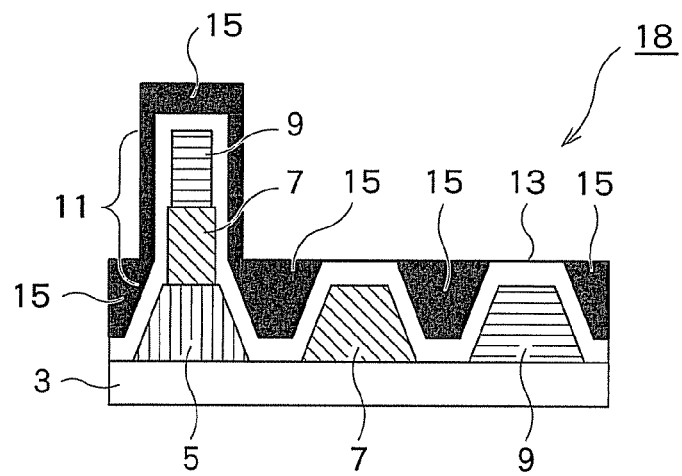
FIG. 5 is a diagram illustrating a color filter according to a second embodiment.

FIG. 5 is a diagram illustrating a color filter 18 according to a second embodiment. In the following description, the same reference numerals are used for the same elements as in the color filter 1 according to the first embodiment, and a duplicate description thereof will be omitted. FIGS. 5, 6(a), 6(b), 7(a), 7(b), 8(a), 8(b) are cross-sectional views in the same C-C' cross-section as in FIG. 4E(e-1), and show the cross-section of a spacer 11 or a spacer 12 together with a green layer 7 and a blue layer 9 in a pixel.

The color filter 18 includes the substrate 3, the colored layers 5, 7, 9 and the spacer 11. The side of the spacer 11 is covered with the black matrix layer 15. The black matrix layer can be formed in the same manner as in the first embodiment.

According to the second embodiment, most part of the spacer 11, including the side wall, is covered with the black matrix layer 15, without the transparent electrode layer 13 on the top and the side wall of spacer 11 being exposed. Thus, in addition to the same advantages as obtained by the first embodiment, the second embodiment further has the advantage of no possibility of short circuit between the transparent electrode layer 13 and an electrode of a TFT substrate.

Furthermore, in addition to the same advantages as obtained by the first embodiments, the second embodiment further has the advantage of enhanced strength of the spacer 11 due to the black matrix layer 15 covering the spacer 11.

A third embodiment will now be described.

Figure 6:
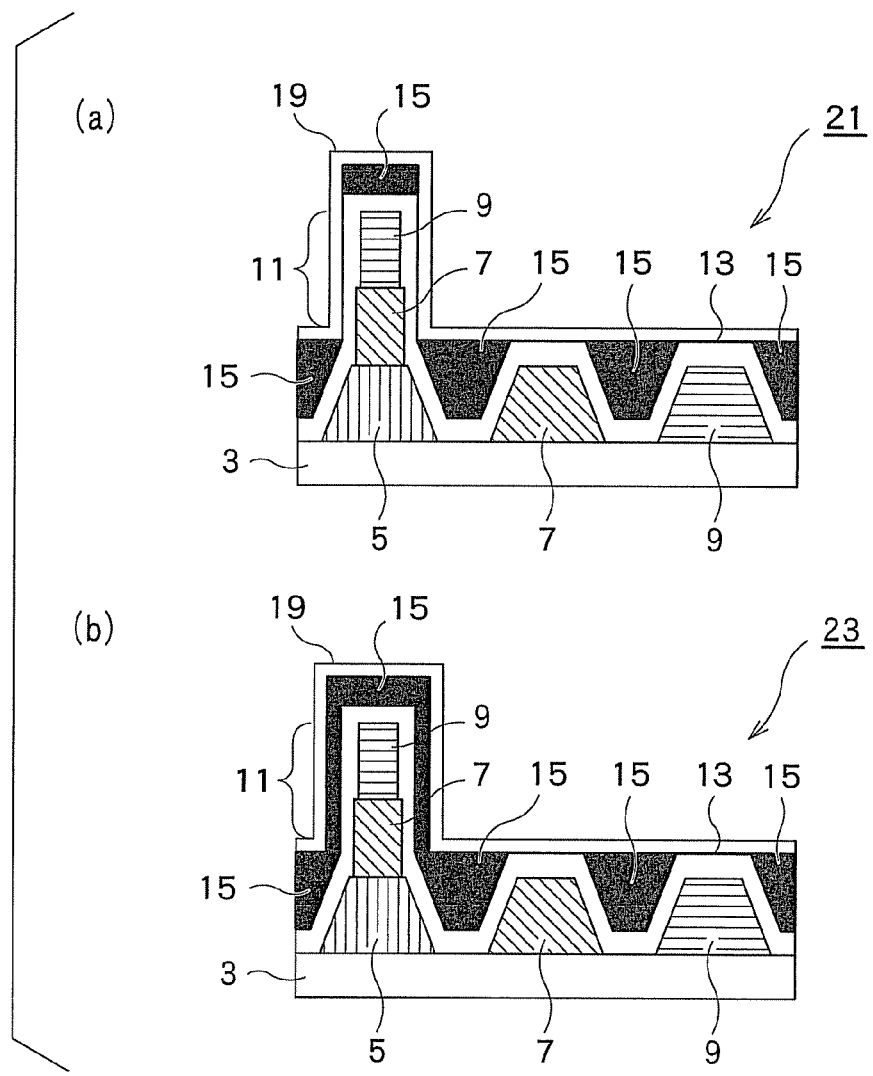
FIG. 6(a) is a diagram illustrating a color filter according to a third embodiment.
FIG. 6(b) is a diagram illustrating a color filter according to a fourth embodiment.

FIG. 6(a) is a diagram illustrating a color filter 21 according to a third embodiment.

The color filter 21, in addition to the construction of the color filter 1 of the first embodiment, has a protective layer 19 formed on the transparent electrode layer 13 and the black matrix layer 15.

The protective layer 19 is formed from a light transmissive photosensitive resin composition or of a light transmissive inorganic material.

The above-described photosensitive resin compositions usable for the red layer 5 can be used also for the protective layer 19.

Silicon nitride, silicon oxide, aluminum oxide, tantalum oxide, etc. can be used as the inorganic material.

The protective layer 19 may be formed either by applying the photosensitive resin composition or by vapor-depositing or sputtering the inorganic material onto the transparent electrode layer 13 and the black matrix layer 15.

The protective layer can prevent impurities, deriving from the red layer 5, the green layer 7, the blue layer 9 and the black matrix layer 15, from being dissolved into a liquid crystal layer.

The third embodiment, in addition to the same advantages as obtained by the first embodiment, further has the advantage that when the color filter 21 is used in a liquid crystal display device, the filter can prevent contamination of a liquid crystal layer, thereby reducing defective display.

A fourth embodiment will now be described.

FIG. 6(b) is a diagram illustrating a color filter 23 according to a fourth embodiment.

The color filter 23, in addition to the construction of the color filter 18 of the second embodiment, has a protective layer 19 formed on the transparent electrode layer 13 and the black matrix layer 15.

The protective layer 19 can be formed by using the same material and method as described above with reference to the protective layer 19 according to the third embodiment.

The fourth embodiment, in addition to the same advantages as obtained by the second embodiment, further has the advantage that when the color filter 23 is used in a liquid crystal display device, the filter can prevent contamination of a liquid crystal layer, thereby reducing defective display.

A fifth embodiment will now be described.

Figure 7:
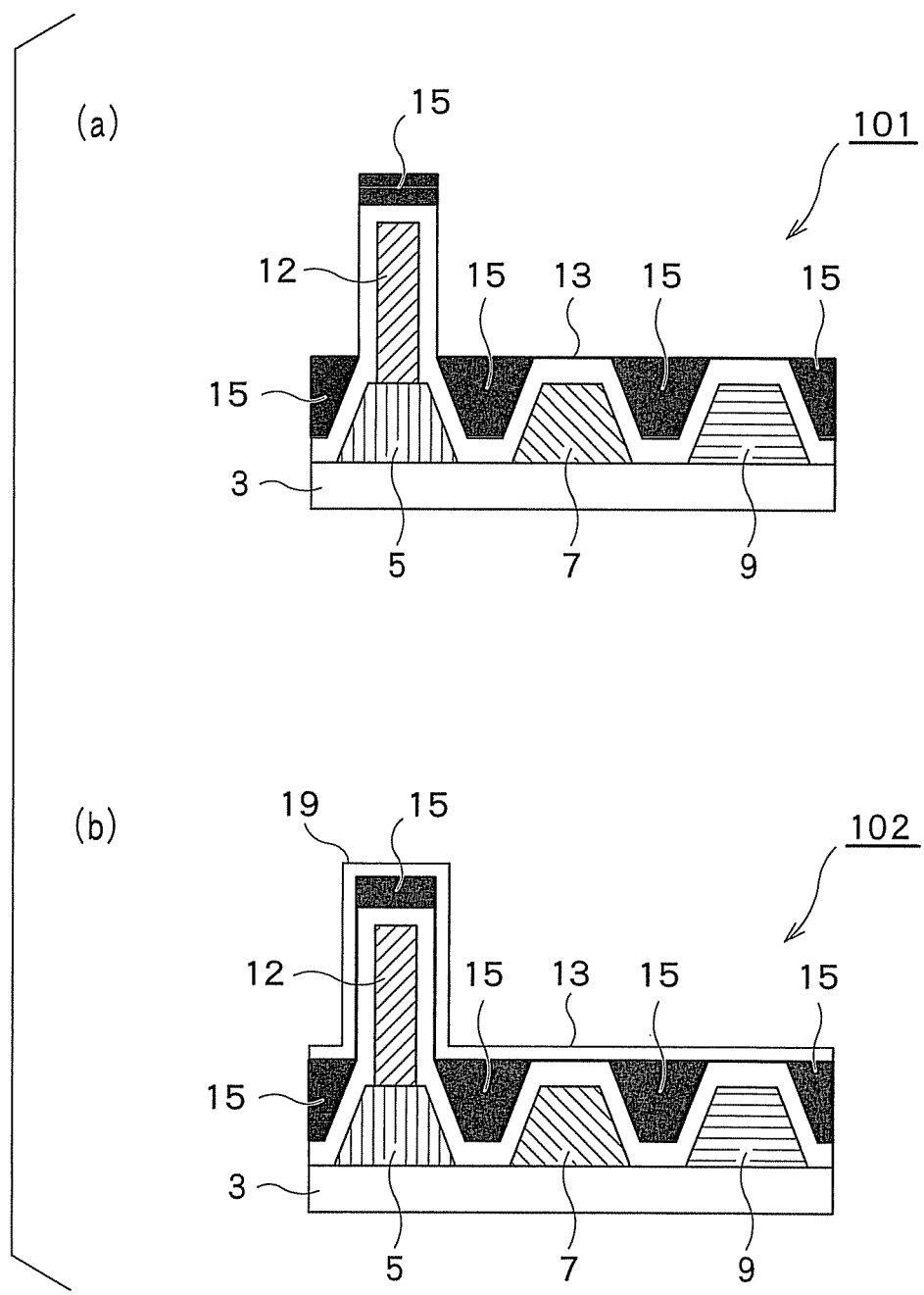
FIG. 7(a) is a diagram illustrating a color filter according to a fifth embodiment.
FIG. 7(b) is a diagram illustrating a color filter according to a sixth embodiment.

FIG. 7(a) is a diagram illustrating a color filter 101 according to a fifth embodiment.

The color filter 101 has the same construction as the color filter 1, except that the spacer 11 of the color filter 1 is replaced with a spacer 12.

Unlike the spacer 11, the spacer 12 is not comprised of the green layer 7 and the blue layer 9, but is formed from a photosensitive resin composition.

The above-described photosensitive resin compositions usable for the red layer 5 can be used also for the spacer 12.

The spacer 12 is formed by applying the photosensitive resin composition to the substrate and carrying out patterning after the formation of the blue layer 9 and before the formation of the transparent electrode layer 13.

As with the spacer 11, the spacer 12 maintains the gap between the color filter 101 and a TFT substrate.

According to the fifth embodiment, the color filter 101 is in contact with a TFT substrate via the insulating black matrix layer 15. Accordingly, short circuit will not occur between the color filter 101 and the TFT substrate.

A sixth embodiment will now be described.

FIG. 7(b) is a diagram illustrating a color filter 102 according to a sixth embodiment.

The color filter 102, in addition to the construction of the color filter 101, has a protective layer 19 formed on the transparent electrode layer 13 and the black matrix layer 15.

The protective layer 19 can be formed by using the same material and method as described above with reference to the protective layer 19 according to the third embodiment.

The sixth embodiment, in addition to the same advantages as obtained by the fifth embodiment, further has the advantage that when the color filter 102 is used in a liquid crystal display device, the filter can prevent contamination of a liquid crystal layer, thereby reducing defective display.

A seventh embodiment will now be described.

Figure 8:
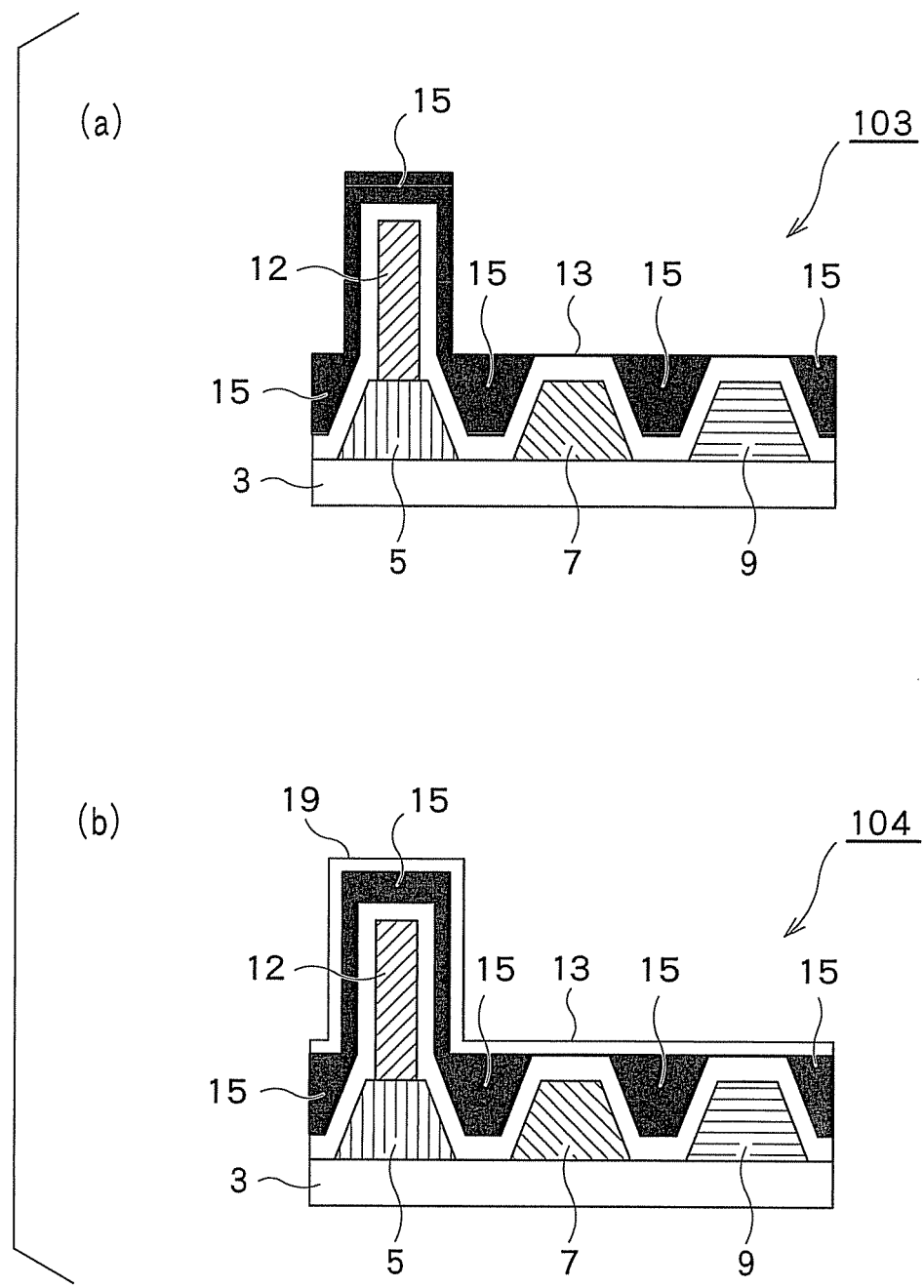
FIG. 8(a) is a diagram illustrating a color filter according to a seventh embodiment.
FIG. 8(b) is a diagram illustrating a color filter according to a eighth embodiment.

FIG. 8(a) is a diagram illustrating a color filter 103 according to a seventh embodiment.

The color filter 103 has the same construction as the color filter 18, except that the spacer 11 of the color filter 18 is replaced with a spacer 12.

The spacer 12 can be formed in the same manner as in the fifth embodiment.

According to the seventh embodiment, the color filter 103 is in contact with a TFT substrate via the insulating black matrix layer 15. Accordingly, short circuit will not occur between the color filter 103 and the TFT substrate.

Further, according to the seventh embodiment, the transparent electrode layer 13 on the top of the spacer 12 will not be exposed even if the black matrix layer 15 is displaced from the normal position. Short circuit therefore will not occur between the transparent electrode layer 13 and an electrode of the TFT substrate.

Further, according to the seventh embodiment, the spacer 12 can have an enhanced strength due to the black matrix layer 15 covering the spacer 12.

An eighth embodiment will now be described.

FIG. 8(b) is a diagram illustrating a color filter 104 according to an eighth embodiment.

The color filter 104, in addition to the construction of the color filter 103, has a protective layer 19 formed on the transparent electrode layer 13 and the black matrix layer 15.

The protective layer 19 can be formed by using the same material and method as described above with reference to the protective layer 19 according to the third embodiment.

The eighth embodiment, in addition to the same advantages as obtained by the seventh embodiment, further has the advantage that when the color filter 104 is used in a liquid crystal display device, the filter can prevent contamination of a liquid crystal layer, thereby reducing defective display.

While preferred embodiments of the present invention have been described with reference to the drawings, the present invention is not limited to the embodiments. It will be understood by those skilled in the art that various changes and modifications may be made to the embodiments within the inventive concept disclosed herein and without departing from the scope of the present invention.

The invention claimed is:

1. A color filter comprising:
    a substrate;
    a colored layer formed on the substrate;
    a spacer formed on the colored layer;
    a transparent electrode layer which covers the substrate, the colored layer and the spacer; and
    a black matrix layer formed on the transparent electrode layer on the substrate and the spacer,
    wherein the spacer comprises at least one colored layer, having a different color from that of the colored layer, laminated on the colored layer, so that the spacer including the colored layer is independent of the black matrix layer and is higher than a height of the black matrix layer on the transparent electrode layer on the substrate and exerts a spacer function.

2. The color filter according to claim 1, wherein the spacer is covered with the black matrix layer.

3. The color filter according to claim 2, further comprising a protective layer on the transparent electrode layer and the black matrix layer.

4. The color filter according to claim 1, further comprising a protective layer on the transparent electrode layer and the black matrix layer.

5. A method for manufacturing a color filter comprising the steps of:
    (a) forming a first colored layer of one color on a substrate;
    (b) forming a second colored layer of another color on the substrate and on the first colored layer, thereby defining a spacer consisting of the second colored layer on the first colored layer;
    (c) forming a transparent electrode layer on the substrate, the first colored layer and the spacer; and
    (d) forming a black matrix layer on the transparent electrode layer on the substrate and the spacer, so that the spacer including the colored layer is independent of the black matrix layer and is higher than a height of the black matrix layer on the transparent electrode layer on the substrate and exerts a spacer function.

6. The method for manufacturing a color filter according to claim 5, wherein in the step (d) of forming a black matrix layer, the black matrix layer is formed such that it covers the spacer.

7. The method for manufacturing a color filter according to claim 5, further comprising the step (g) of forming a protective layer on the transparent electrode layer and the black matrix layer after the step (d) of forming the black matrix layer.

8. A color filter comprising:
    a substrate;
    a colored layer formed on the substrate;
    a spacer formed on the colored layer;
    a transparent electrode layer which covers the substrate, the colored layer and the spacer; and
    a black matrix layer formed on the transparent electrode layer on the substrate and the spacer;
    wherein the spacer comprises a photosensitive resin composition laminated on the colored layer, so that the spacer including the photosensitive resin composition is independent of the black matrix layer and is higher than the black matrix layer on the transparent electrode layer on the substrate to exert a spacer function.

9. The color filter according to claim 8, wherein the spacer is covered with the black matrix layer.

10. The color filter according to claim 9, further comprising a protective layer on the transparent electrode layer and the black matrix layer.

11. The color filter according to claim 8, further comprising a protective layer on the transparent electrode layer and the black matrix layer.

12. A method for manufacturing a color filter comprising the steps of:
    (a) forming a colored layer of one color on a substrate;
    (b) forming a photosensitive resin composition on the colored layer, thereby defining a spacer consisting of the photosensitive resin composition on the colored layer;
    (c) forming a transparent electrode layer on the substrate, the colored layer and the spacer; and
    (d) forming a black matrix layer on the transparent electrode layer on the substrate and the spacer, so that the spacer including the photosensitive resin composition is independent of the black matrix layer and is higher than a height of the black matrix layer on the transparent electrode layer on the substrate and exerts a spacer function.

13. The method for manufacturing a color filter according to claim 12, wherein in the step (d) of forming a black matrix layer, the black matrix layer is formed such that it covers the spacer.

14. The method for manufacturing a color filter according to claim 12, further comprising the step (g) of forming a protective layer on the transparent electrode layer and the black matrix layer after the step (d) of forming the black matrix layer.

* * * * *